United States Patent

[11] 3,566,081

[72] Inventor Robert N. Goldman
Pacific Palisades, Calif.
[21] Appl. No. 688,179
[22] Filed Dec. 5, 1967
[45] Patented Feb. 23, 1971
[73] Assignee Telecredit, Inc.

[54] MONETARY TRANSACTION REGULATION APPARATUS
10 Claims, 6 Drawing Figs.

[52] U.S. Cl. ................................................ 235/61.9, 340/149
[51] Int. Cl. ................................................ G05b 1/00, G06k 1/12
[50] Field of Search ..................................... 235/61.9, 61.7 (b); 340/149 (AX); 331/113; 332/14

[56] References Cited
UNITED STATES PATENTS
2,929,030  3/1960  Wier ............................. 331/113
3,056,116  9/1962  Crane ........................... 340/174
3,315,230  4/1967  Weingart ....................... 179/2(CA)

OTHER REFERENCES
Millman & Taub, "Pulse and Digital Circuits," McGraw-Hill, 1956, pages 199— 201

Primary Examiner—Daryl W. Cook
Assistant Examiner—Thomas J. Sloyan
Attorney—Nilsson, Robbins, Wills and Berliner ABSTRACT: A system is disclosed for regulation of commercial transactions on the basis of preestablished criteria. A bistable device is free-running to command or dismiss the requirement for approval on each transaction, depending upon its state. The testing operation is linked with printing an identification on a sales record. The state of the bistable device which determines the requirement for approval varies, depending upon the nature of the installation, the importance of the transaction, and the experience of the system in a particular location.

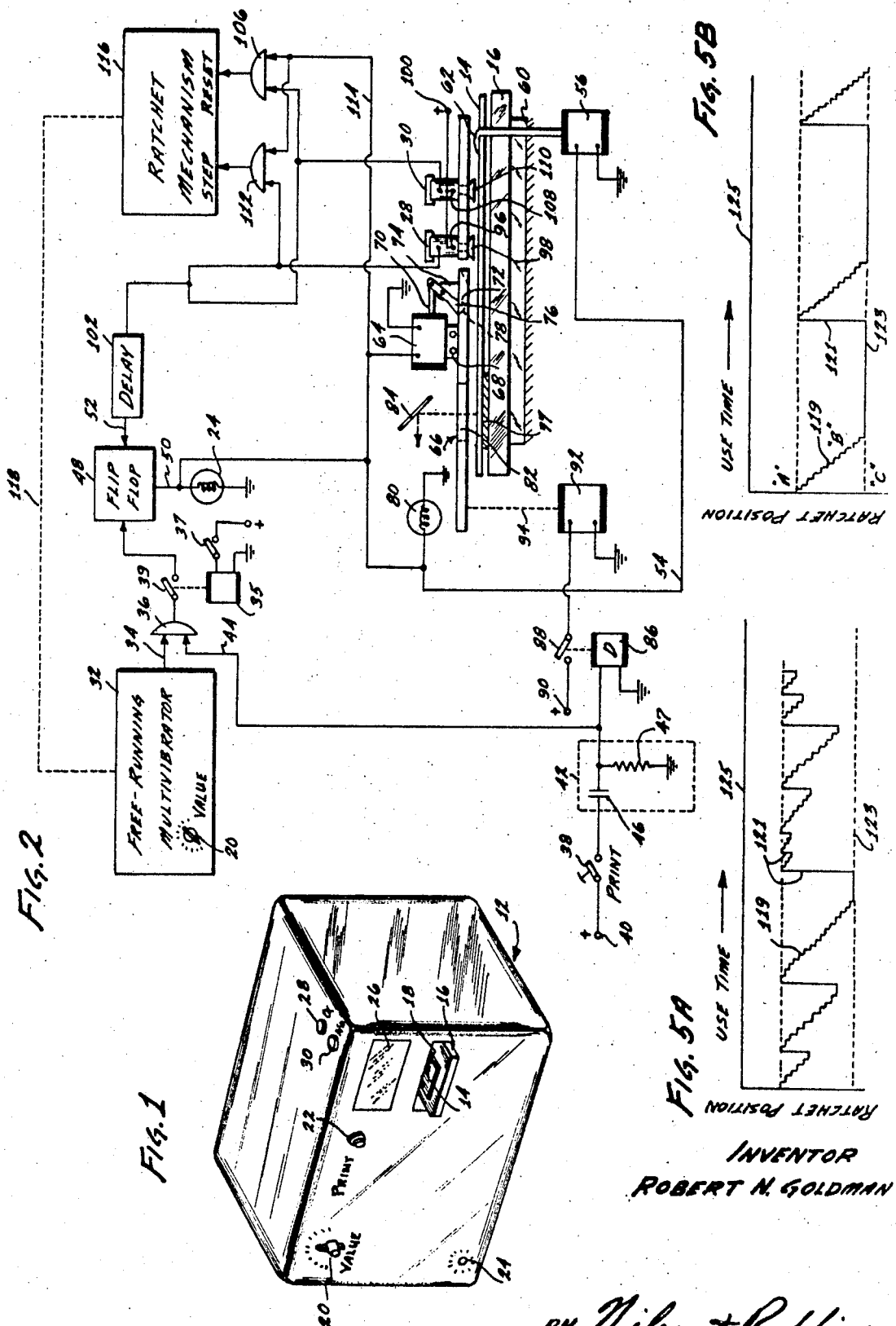

INVENTOR
ROBERT N. GOLDMAN

BY Nilsson + Robbins
ATTORNEYS

MONETARY TRANSACTION REGULATION APPARATUS

As disclosed, the apparatus incorporates a printing mechanism for receiving a credit card (other identification or the like) along with a sales record. The printing apparatus also incorporates means for stamping an indication on the sales record that approval is required, when such is the case. The printing apparatus also includes structure for indicating actual approval on the sales record (after the requirement therefor has been indicated) which apparatus varies the time relationship between the two states of the bistable device to establish a "history" or experience record for the system in a particular installation that will affect future operation. An integrated system for automated approval (or disapproval) is also disclosed.

BACKGROUND AND SUMMARY OF THE INVENTION

Many different types of identification cards and credit cards have now come into widespread use to identify business establishments. These cards may or may not carry embossed letters for printing on a sales slip or other record; however, their major function is that of identification, to enable their bearers to avoid carrying significant amounts of money. However, these identification means, and the procedures and methods attendant their use are not without certain difficulties. For example, the bearer of an identification card may become irresponsible due to financial reverses or a card may be lost or stolen, in any of which cases it becomes desirable to invalidate the card and halt its further use. Difficulty then frequently arises in attempting to recover such a card from its present holder.

One of the techniques that has been widely practiced by organizations that issue credit cards has been to specify each card as valid for a limited period of time. For example, a business establishment might issue credit cards that specifically state an expiration date on their face. In the normal practice, prior to the date of expiration, fresh credit cards would be delivered to continuing potential customers in good standing, in order to perpetuate the system of credit transactions. By this technique, the difficulties arising from: lost cards, stolen cards, and occurrences of individual financial responsibility, are curbed periodically by the issuance of new cards. The procedure is exceedingly expensive and results in some confusion both among potential customers and among persons handling actual credit transactions, yet, is of somewhat questionable value. Specifically, the system is helpless against the holder of a lost or stolen card, during the critical period immediately after the card is lost or stolen during which a card may be excessively used. That is, a person improperly possessing a credit card will normally use it for a short period after its loss by the proper bearer, knowing that subsequently persons to whom the card is presented will be alerted. The periodic reissue of cards does not prevent such use during the period immediately after loss.

Another technique sometimes employed by organizations issuing credit cards or the like involves the use of so-called "floor limits." Specifically, for example, a store may instruct its clerks to accept all credit card purchases or transactions which do not exceed a specified dollar limit. Those transactions which do exceed the preestablished limit require approval from a manager or from central credit records which contain current information on revoked or invalid credit cards.

One variation of the "floor limit" system involves periodic reduction of the floor limit to zero during an interval when all credit transactions require approval. The demands imposed upon the approval facility during such an interval are exceedingly heavy; however, such a load can be anticipated. As a result, perhaps a more serious problem attendant this procedure involves customer delay and inconvenience. Additionally persons contemplating fraudulent use of a credit card can usually observe that all transactions are being submitted for approval with the result that the stolen or lost card will not be presented. These same difficulties arise in the various techniques of establishing patterns of transactions requiring approval. That is, an arbitrary pattern that every third transaction must be approved normally becomes well known to fraudulent card users and also tends to perpetuate considerable confusion in the processing of transactions.

In view of the above and related difficulties the need is apparent for an improved apparatus for facilitating regulation of credit and other monetary transactions. In this regard, credit cards have come into widespread use which carry embossed letters suitable for printing a purchaser's name and/or other identification on a sales record. The apparatus hereof may be readily embodied in cooperation with such a unit so that in the routine course of processing a sales record, a sales clerk is automatically informed whether or not approval is required and he is somewhat compelled to obtain those approvals. Also, the system may further include structure for automated approval, and in that regard, the system will improve the efficiency of a credit center computer to a considerable extent. That is, the system hereof can increase the capability of a central computer to accomplish tight control over a significantly increased number of stations.

The system hereof incorporates a bistable device, freely oscillating between its two states which determine whether or not approval for a transaction will be required. The bistable device indicates the requirement for approval if the test operation occurs when the bistable device is in one of its two states. Conversely, if the device is caught in the other state during test, no approval is required. The time relationship of the two states of the bistable device are controlled to be varied in accordance with: the importance of the transaction, the particular location at which the apparatus is to be operated, and the experience of the apparatus at a particular location. As a result the apparatus develops an effective control for credit transactions with convenience and ease for both customers and persons handling the transaction. Furthermore, the system hereof may be embodied in a particularly economical apparatus.

BRIEF DESCRIPTION OF THE DRAWINGS

In the drawings, which constitute a part of this specification, an exemplary embodiment demonstrating various objectives and features hereof set forth, specifically:

FIG. 1 is a perspective view of an apparatus incorporating the present invention;

FIG. 2 is a schematic and block diagram of the system incorporated in the structure of FIG. 1;

FIGS. 5A and 5B are diagrammatic presentations illustrative of the operation of the system hereof at poor and better credit stations, respectively.

DESCRIPTION OF THE ILLUSTRATIVE EMBODIMENT

Figure 3:
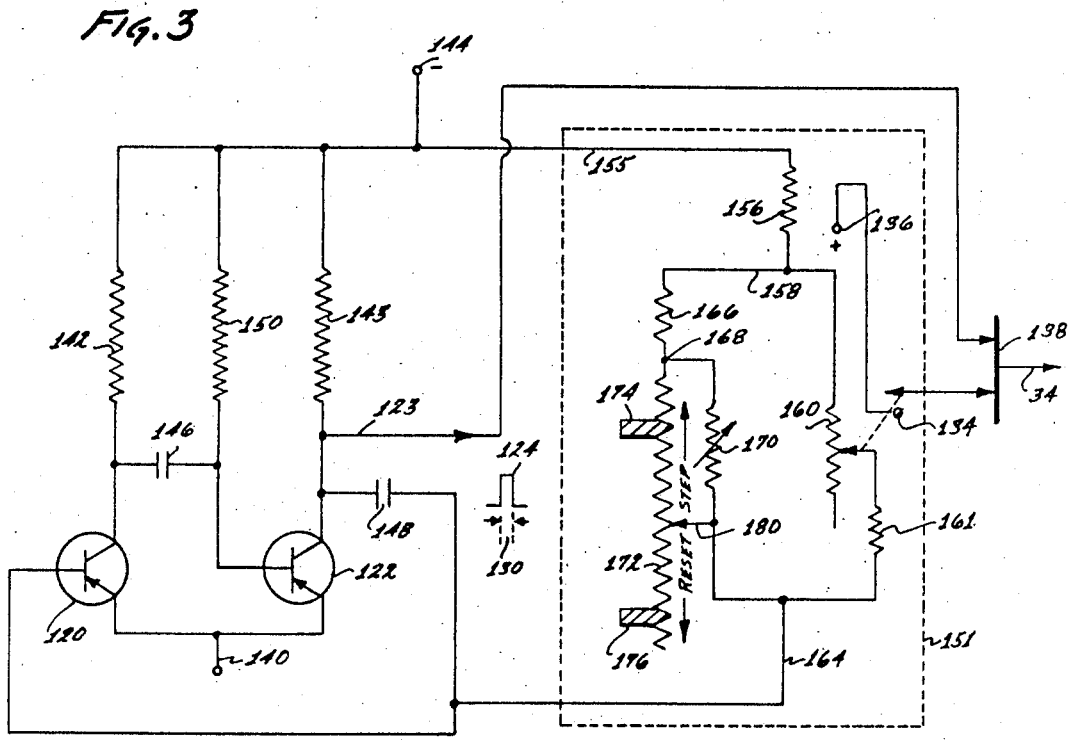
FIG. 3 is a schematic diagram of one component of the system of FIG. 2.

As required, a detailed illustrative embodiment of the invention is disclosed herein. However, it is to be understood that the embodiment merely exemplifies the invention which may be variously embodied in other forms that are radically different from the form disclosed herein. Therefore, specific structural and functional details disclosed herein are not to be interpreted as limiting, but merely as constituting a basis for the claims defining the true scope of the invention.

Referring initially to FIG. 1, there is shown a cabinet or housing 12 embodying a control apparatus for cooperative operation with sales records 14 in the form of at least one sheet of paper. In an exemplary application hereof, sales records constitute a record of the transaction as a sales slip, upon which the details of the transaction are written while the customers name and identification is printed thereon, for example, from a credit card. As shown in FIG. 1, the sales record 14 (along with a credit card) is supported on a tray 16 which is received in the housing 12 through a slot 18. With the sales record 14 positioned in the housing 12, indicia that is embossed on an associated credit card is transferred to the record 14, and, during the same interval, an indication is provided as to whether or not approval for the transaction is required.

The detailed operation of the unit as shown in FIG. 1 may now be best explained by assuming an exemplary sequence of operations as might exist in an actual installation. Therefore, assume a customer has made certain purchases which are to be debited to his account on the basis of a presented credit card which is embossed with identification. Furthermore, assume that the clerk or other operator has recorded the purchases on the sales record 14, and placed the record along with the credit card (not shown) on the tray 16 inserting the composite into the housing 12 through the slot 18. Thereafter, the clerk sets a dial knob 20 to indicate the dollar value of the transaction on an associated dial which setting is directly related to the importance of the transaction as a potential loss. The operator then depresses a test or "print" pushbutton 22 which operates the mechanism within the housing 12, as described in detail below, causing the indicia embossed on the card to be printed on the record 14. During the same period, the system operates on a statistically logical basis to determine whether or not the instant transaction requires additional approval.

If approval of a transaction is required, a lamp 24 is illuminated to signal that requirement. With the illumination of the lamp 24, the tray 16 along with the record 14 and the credit card (not shown) are locked in the housing 12. To accomplish their release, the operator has the identified customer approved (as by check with central office). During the interval, the identification for the customer is projected on a screen 26 which may be consulted by the clerk in consulting central office or otherwise obtaining approval.

If the credit transaction (and the identified credit card) are approved as by a telephone call to the central office, the operator simply depresses a button 28. As a result, the printing apparatus within the housing 12 stamps the sales record 14 to indicate approval. If, however, the approval is refused, the operator depresses a button 30 which prints a rejection notice on the sales record 14.

Upon depression of either of the buttons 28 or 30, the tray 16, along with the sales record 14 is released and may be withdrawn from the slot 18. The approval given to the transaction, or the absence thereof, is recorded within the structure and employed as a basis for establishing the periodicity with which approvals must be obtained for future transactions controlled by the apparatus of FIG. 1.

Recapitulating, the apparatus of FIG. 1 prints indicia upon a sales record from a credit card or the like, then indicates either that the transaction requires no approval or that it requires approval. This determination is performed on the basis of: the importance of the transaction (dollar value) the judgement of management; and the experience of the system in a particular location. If no approval is required, the transaction is consummated. However, in the event approval is required, the credit card, along with the record 14 is retained until approval is received, which approval (or the absence thereof) is indicated on the record 14 and tallied within the apparatus, as will be explained in detail below.

The structure of FIG. 1 may be operated without external connections, and may in fact be battery powered for independence from even a power supply. That is, the structure of FIG. 1 may be placed adjacent to sales stations in the store or other commercial establishment to be operated completely independent of other apparatus. In that event, as explained above, the approval is obtained manually or by other means. However, the structure hereof also may be incorporated in an automatic system wherein approval is provided from a central processor in accordance with the system described below. In the event that the unit is associated with a central processor, the operator and the customer, may be unaware as to whether or not approval is sought for the transaction. In this regard, in the event of a temporary failure in communication or in the central processor, they remain totally unaware of such failure. Therefore the unit offers the threat of continuous vigilance to those seeking to perpetuate a fraud.

As indicated above, the basis for determining whether or not approval shall be required depends upon the state of a bistable device at the instant when the transaction is submitted for test. Specifically, a free-running multivibrator 32 (FIG. 2) has two different states during distinctly separate alternate time intervals. If the test inquiry occurs during one of these time intervals, the transaction requires approval. However, if the test occurs during the other time interval, no approval is required, unless the dollar value of the transaction is above a lever requiring approval under any circumstances.

The multivibrator 32 functions somewhat as an oscillator operating at a relatively high frequency with regard to frequencies which are humanly perceptible (e.g. 50 cycles per minute) so that the determination of whether or not approval is required for a transaction occurs on a statistical basis depending upon the instant of test and the likelihood that the multivibrator 32 will be in the state requiring approval. As explained in detail below, the probability during test depends upon the various factors (including the historical experience of the system) which are applied in the multivibrator 32.

Considering the system in greater detail, the particular state of the multivibrator which requires an approval results in the application of the high value of a two-state signal through a conductor 34 to an AND gate 36. Gates satisfactory for use as the specific gate 36 are well known and very widely used in data processing systems of the prior art. Functionally, the gate 36 provides passes to the high state of a two-state signal whenever all its input signals are in a high state.

The gate 36 has one input that is provided through the conductor 34 and another input that is provided through a manually-operated switch 38 (lower left) that is connected to a terminal 40 adapted to receive a positive potential. The output from the switch 38 is supplied through a passive pulse-forming circuit 42 to an input conductor 44 of the gate 36. The pulse circuit 42 includes a capacitor 46 connected in series between the switch 38 and the conductor 44 along with a shunt resistor 47 to ground. In operation, each closure of the switch 38 results in application of a substantially uniform pulse through the conductor 44 to the gate 36, during the period while the capacitor 46 is charged through the resistor 47.

In the fundamental operation of the system, the switch 38 is operated manually (by pushbutton 22, FIG. 1) to command a printing operation (test) by the unit and thereby submits the transaction for determination as to whether or not approval must be obtained. If the free-running multivibrator 32 is in one state, no approval is required; however, if caught in the other state, approval is required. When approval is commanded, the signal appearing in the conductor 34 is high, qualifying the gate 36, which along with the high signal in the conductor 44 results in the passage of a high signal from the gate 36 to set a flip-flop 48. Bistable devices satisfactory for use as the flip-flop 48 are exceedingly well known in the prior art and function to provide a two-state signal which is either high or low depending upon which of the two states the flip-flop occupies.

Assuming, for the present, that a relay 35 is energized by a closed switch 37, so that contacts 39 are closed, a pulse from the gate 36 sets the flip-flop 48 to provide a high signal to a conductor 50. The flip-flop 48 is then reset only upon receiving a signal through a conductor 52, after which the output to the conductor 50 becomes low. Thus, the flip-flop 48 is set to command the approval of the instant transaction, and provides a control signal to function in that regard. Upon obtaining approval (or disapproval) and printing such approval on the charge slip 14, the flip-flop 48 is reset preparatory to another operation by the system. When the flip-flop 48 is set, the high signal therefrom in the conductor 50 immediately energizes a lamp 24 signifying to the operator that approval must be obtained. This visual signal, of course, may be eliminated in the automated system.

The signal carried in the conductor 50 from the flip-flop 48 is also applied through a conductor 54 (bottom, central) to a solenoid 56, the armature 58 of which extends to lockingly clamp the charge slip or record 14 and the tray 16 to a rigid support table 60. Thus, if approval is required, the transaction record 14 is locked in the apparatus along with the customer's credit car 77 until approval is obtained.

The approval-commanding signal appearing in the conductor 50 from the flip-flop 48 is also applied to a solenoid 64 which is horizontally affixed on a printing plate 66 above the paper record 14, by a bracket 68. The solenoid 64 carries an armature 70 which is pivotally connected to a print bar 72 which is pivotally carried on a bracket 74, also affixed on the plate 66. Thus, when the solenoid 64 is energized, the print bar 72 is placed in a vertical position in which the face 76 thereof is placed to extend from an aperture 78 in the plate 66. As a result, during the vertical movement of the plate 66 (driving the sales record 14 into firm contact with a credit card 77 to transfer or print from the card onto the record) the type carried on the print face 76 is also printed upon the charge record 14. The paper record 14 may, for example, comprise a form of pressure sensitive paper which is imprinted by pressure alone as well known and widely used. Therefore, when the record 14 is clamped between the plate 66 and the raised letters (not shown) on the card 77, those letters are printed on the upper surface of the record 14.

Recapitulating, prior to any printing operation, the energization of the solenoid 64 positions a typeface 76 in an operative printing position, if (and only if) the transaction has been designated as one requiring approval. Thereafter, during the operation of printing the embossed letters from the card 77 on the record 14, the print face 78, may or may not be operative, depending upon whether or not approval is required.

In addition to the above-described operations occurring when the flip-flop 48 is set, one other aspect involves the energization of a small lamp 80 (centrally located) that is positioned to illuminate the indicia printed on the record 14 (from the credit card 77) through a transparent section 82 of the printing plate 66, so that such indicia is reflected as a light image from a mirror 84 to be displayed on the frosted screen 26 (FIG. 1). That is, as the credit card and the record 14 are held within the apparatus pending approval or disapproval of the transaction, it has been found advisable to provide the operator a presentation of the customer's name and/or other pertinent identification. IN this regard, it is readily apparent that in less sophisticated systems hereof, the card may be returned to the operator, as during a two-step control process, in which the light presentation disclosed herein would be eliminated. Again, recapitulating, in the event that the instant transaction requires approval: the sales record 14 (along with the credit card 77) is locked within the apparatus; a typeface 76 (indicating the requirement for approval) is placed in an operative position, a visual signal that approval is required is given to the operator by the energization of the lamp 24; and the sales record 14 is illuminated for a light presentation of the customer's identification on the screen 26. These preliminary operations all occur an instant prior to the time when the embossed letters of the credit card are actually printed on the sales record 14. Of course, if the transaction is not designated as one requiring approval, these preliminary operations are not performed.

The actual printing from the card 77 to the record 14 is initiated by the pulse from the pulse circuit 42 which is applied to a delay relay 86 that closes contacts 88 almost immediately after receiving a pulse from the circuit 42. The slight time delay is provided to afford the above-described preliminary operations to be accomplished in the event that the transaction has been designated as one requiring approval.

Upon closure of the contacts 88, a current flows from a source of potential applied to a terminal 90, through the contacts 88 to energize a solenoid 92. As indicated by a conventional dash line 94, the spring-biased solenoid 92 is mechanically connected to the printing plate 66 and upon energization pulls the printing plate 66 into stamping engagement with the sales record 14. As a result, the embossed letters or other indicia borne on the credit card 77 are transferred to be visibly manifested on the upper surface of the record 14. Additionally, if the transaction has been designated as requiring approval, either the word "approval" or an abbreviated coded, or alternate form of such a word is also printed on the sales record 14 by the type face 76.

The energization of the solenoid 86 is momentary, as is the closure of the contacts 88 and the energization of the solenoid 92 by the momentary closure of contacts 88. Therefore, the printing plate 66 simply moves through power and return strokes to accomplish the printing operation as described above. In this regard, the solenoid 92 incorporates springs or the like (not shown) to accomplish the return stroke.

In view of the above preliminary description of structure incorporated in the illustrative embodiment, a complete understanding of the operation thereof may now be best accomplished by considering some subsequent operations of this system then explaining a sequence-of-operation in detail. Proceeding in that manner, in the event that the instant transaction does not require approval, the transaction record 14 along with the credit card 77 simply is removed from the apparatus and the transaction is completed. However, if the transaction requires approval, obtaining that approval (or disapproval) is the next step, afterwhich the operator appropriately actuates one of the buttons 28 or 30 (FIG. 1 and 2) to stamp the sales record 14 accordingly. Then, the sales record 14 along with the credit card 77, is released for withdrawal from the apparatus. As indicated above, the nature of the response from the request for approval is actually registered within the structure of the multivibrator 32 (described in detail below) to accomplish statistical control of the future operation of the multivibrator 32 and in turn regulate the transactions controlled thereby.

Considering the structure which accomplished these operations, assume that the transaction on a charge record 14 (currently in the apparatus) is designated as one which requires approval. As explained above, the paper record 14 is locked within the apparatus and concurrently stamped to indicate that approval is required. In this regard, it is to be noted that if the record 14 is in some way or another removed from the apparatus, it bears a designation indicating that the clerk or operator has the responsibility of obtaining approval and did not fulfill that responsibility. Therefore, unless such approval is obtained, the responsibility for failing to pursue it falls clearly upon the operator. In this regard, it is to be understood that in embodiments hereof, either the lock feature or the feature of stamping the record 14 with a need for approval may be individually employed without the other. That is, these features afford redundant operation and increased safety when both are used; however, each is usable alone.

Assuming that the request for approval is affirmative, the operator's depressing the button 28 (FIG. 2) accomplishes two separate operations. Specifically, the button 28 carries normally-open electrical contacts 96 and a typeface 98 bearing the word "approved" or an equivalent thereto. Therefore, when the button 28 is depressed, the charge record 14 is stamped as being approved and additionally the contacts 96 are closed completing a circuit path from a terminal 100 (connected to receive positive potential) to a delay circuit 102 and to an AND gate 112. Somewhat similarly, the button 30 (for use in the event of a disapproval) carries contacts 108 and a typeface 110 bearing the the word "disapproved," or equivalent. The contacts 108 are connected from the terminal 100, in parallel with the switch contacts 96 to the delay circuit 102 and to gate 106. As a result, upon the depression of either of the buttons 28 or 30, one of the contacts 96 or 98 is closed to supply a signal to the delay circuit 102 and to one of the AND gates 106 or 112. The delay circuit imposes a brief time delay then supplies a pulse through the conductor 52 to reset a flip-flop 48 to its quiescent state. However, prior to that operation, the qualified AND gate 106 or 112, both of which receive a high signal through a conductor 114 from the flip-flop 48, supplies a pulse to a stepping ratchet mechanism 116. If the gate 106 is qualified, as occurs when a transaction is disapproved, the ratchet mechanism 116 is reset (reset solenoid not shown) as to an extreme counterclockwise position. However, should the AND gate 112 be qualified as occurs in the case of an "approved" transaction, the ratchet mechanism 116 is stepped (stepping solenoid not shown) in the opposite direction, e.g. clockwise.

Of course, a wide variety of different forms for the ratchet mechanism 116 are well known in the prior art as for example incorporating a stepper motor, or as indicated above, alternatively a very simple ratchet driven and set by a pair of solenoids. The rotary position of the ratchet mechanism 116 is coupled mechanically to a lead screw potentiometer (not shown) embodied in the multivibrator 32. This mechanical coupling may simply comprise a direct rotary shaft and is indicated in the conventional manner by a dashed line 118. Thus, the ratchet mechanism 116 along with a potentiometer in the multivibrator 32 maintain a record of prior transactions. If the record is favorable, the percentage of transactions specified for approval is reduced. However, if the record of transactions is unfavorable, the percentage of transactions specified for approval is increased. The operating history of the ratchet mechanism to control a potentiometer is depicted for an unfavorable station in FIG. 5A and a more favorable station in FIG. 5B. Each small step 119 (downward) indicates a favorable credit check in which the ratchet is advanced (gate 112 qualified) while each return 121 to the upper limit indicates an unfavorable credit check (gate 106 qualified). The limit for reducing the statistical number of approvals is indicated by lines 123, while the limit for increased approvals is indicated by the lines 125. Noting that the ratchet mechanism 116, operation as illustrated in FIG. 5A involves frequent reset, while that depicted in FIG. 5B involves infrequent reset, it is still apparent that both operations involve a considerable saving. That is, the area under the curves establish a statistical level of economical control of credit transactions.

From the above, it is apparent that the system adapts the requisite approval procedure to a particular business location in accordance with capability, and furthermore continually monitors transactions at that business location to perceive the necessity of policy changes.

As another feature hereof, the system can be placed in a mode of operation in which no approvals are required, yet without informing the operator of the fact. For example, for one reason or another, the facility for providing approval may be incapacitated so that it should not be consulted. Thereupon, the switch 37 (physically located at the approval facility) is opened deenergizing the solenoid 35 to open its contacts 39, so that the flip-flop 48 cannot be set. As a result, tests for approval invariably dismiss the requirement; however, the operator of the unit is not aware the system is somewhat incapacitated. Similarly, would be fraudulent subjects are also totally unaware of such incapacity. This feature is particularly significant to accommodate an inoperative central computer, peak operation loads, and so on.

Furthermore, as will now be considered in detail, the system additionally imposes control on the basis of arbitrary policy limitations imposed thereon, e.g. programming considerations and considerations with respect to the importance of the transactions, e.g. dollar value. The structure for accomplishing such control is embodied in the multivibrator 32 as will now be considered with reference to FIG. 3.

A pair of transistors 120 and 122 are connected as shown in FIG. 3 to provide a free-running multivibrator configuration. Of course, circuits of this type are exceedingly well known and incorporate a wide variety of different devices as well as a wide variety of different operating philosophies. In general, the system here of may incorporate many different forms of such circuit so long as the circuit may be operated in an unbalanced or unsymmetrical cyclic pattern. That is, in accordance with the operating philosophy of this system, the two intervals developed by the multivibrator in FIG. 3 must be relatively variable.

In general, the transistors 120 and 122 operate to provide a signal to an output conductor 123 which is as depicted in the unscaled waveform 124 shown adjacent the conductor 123 in FIG. 3. In this regard, it is to be noted that if a transaction is tested during an interval indicated by the time-related distance 130, that transaction is required to be approved. Alternatively, if the test occurs outside the interval indicated by the distance 130, the transaction is not submitted for approval unless it exceeds a preestablished importance or dollar value. An excessive dollar value results in the closure of contacts 134 (center right) which supply a positive signal from a terminal 136 to a connection gate 138. The arrival of a positive potential or high-level signal at the connection gate 138 either as a result of the instant state of the multivibrator or as a result of an excessive dollar value for a transaction, results in the requirement that a transaction be approved, which is commanded by the passage of a high signal to the conductor 34, as also indicated in FIG. 2.

Considering the multivibrator as depicted in FIG. 3, both the transistors 120 and 122 have their emitter electrodes connected to a source of positive potential applied at a terminal 140. The collector electrodes of the transistors 120 and 122 are connected respectively through resistors 142 and 143 to a terminal 144 which is adapted to receive a negative potential. In further symmetry, the collector electrodes of the transistors 120 and 122 are connected through capacitors 146 and 148 respectively to the base electrode of the other transistor. Completing the circuit configuration, a resistor 150 is connected between the base of the transistor 122 and the terminal 144, while an equivalent resistive network 151 is connected between the base of the transistor 120 and the terminal 144. The intervals provided by the circuit of FIG. 3 depend upon the relative magnitude of the resistances 150 and 151. That is, during the interval that the transistor 120 is conducting for example, a current flows through the transistor 120 and the resistor 150 charging the capacitor 146 to a stage at which the transistor 122 is driven into conduction at its base. Thereupon, the transistor 120 is cut off through the capacitor 148.

Philosophically, the operation of the circuit of FIG. 3 to accomplish the functions described above depends upon the variation of the value of resistance provided by the resistive network 151 in relation to the relatively fixed value of the resistor 150. In this regard, as the resistance of the network 151 increases, the interval represented by the distance 130 increases (because it takes longer to charge the capacitor 148) thereby increasing the probability that a transaction will require approval. As a result, factors resulting in the need for tighter control increase the resistance of the network 151.

The network 151 actually includes several independent resistance elements as will now be considered and which function to afford a composite resistance in accordance with the objectives of this system. Specifically, from the terminal 144, a conductor 155 is connected to a fixed resistor 156 serving to limit the minimum resistance of the composite network 151. The resistor 156 is in turn connected to a junction point 158, one arm of which is connected through a potentiometer 160 and a resistor 161 to the other conductor 164 of the network 151. The junction point 158 is also connected through a fixed resistor 166 to another junction point 168 then in parallel through a variable resistor 170 and a lead screw potentiometer 172 incorporating limit stops 174 and 176. The conductor 164 is connected directly to the resistor 170 and to the variable contact 180 of the lead screw potentiometer 172.

Within the network 151, the lead screw potentiometer 172 comprises the variable resistor embodied within the multivibrator as described above which is adjusted by the ratchet mechanism 116 (FIG. 2). Therefore, in accordance with the results of each request for approval, the contact 180 of the lead screw potentiometer 172 either undergoes a slight incremental movement upward (advancing to decrease the resistance presented by the potentiometer 172 in the network 151) or is reset adjacent the stop 176. In a related manner, the variable resistor 160 along with the contacts 134 are controlled by the value adjustment knob 20 (FIGS. 1 and 2) to establish a representative resistance. That is, the knob 120 incorporates the switch contacts 134 which close when the knob has been turned to a predetermined level, above which value all transactions must be approved.

Thus, the value of a transaction is weighed with regard to its importance, and the historical experience of the unit at a particular installation. In this regard, the limit stops 174 and 176 are preset in accordance with individual judgment, to statistically control the extent to which the potentiometer 172 may alter the percentage of transactions submitted for approval. The variable resistor 170 also affects the degree to which the potentiometer 172 controls the statistical operation. Of course, the control impedances as represented by the resistors 160 and 170 and the potentiometer 172 may be variously provided and connected in numerous different patterns depending upon the specific objectives and programming of the system. However, varieties of such connections will be readily apparent to those skilled in the art depending upon the objectives desired to be accomplished. As illustratively depicted herein, a system is representatively disclosed which has been found effective and wherein independent statistical control impedances are coupled together for cooperative operation to control the operation of the multivibrator and thereby statistically determine the ratio of transactions requiring approval to those which require no approval.

The system as disclosed above may be very effectively employed in a wide variety of different applications, including the station of a sales person in various commercial establishments. At such stations, facilities are usually provided for obtaining approvals on various transactions rather easily. However, the system hereof may also be effectively utilized in applications in which approval is provided by an integral cooperating portion of this system. Such a total system is illustratively represented in FIG. 4 and will now be considered in detail.

The entire apparatus as shown in FIG. 2 and described above is embodied in the system of FIG. 4 as a transaction regulation apparatus 186. Of course, in instances when no approval is required, the transaction control apparatus 186 operates simply to print the customer's identification on a sales or transaction record. However, if a situation arises where an approval is required the flip-flop 48 (FIG. 2) is set resulting in a high signal which is carried from the transaction control apparatus 186 (FIG. 4) by a conductor 190 to an AND gate 192. As a result, the AND gate 192 is qualified to pass signals indicative of the customer, which signals are sensed by a card reader 194. Card readers satisfactory for use as the reader 194 are well known in the prior art, one form being shown in detail in applicant's copending patent application Ser. No. 609,796 and 558,127. Functionally, the card reader 194 senses a credit card to provide signals in a conductor 196 which signals identify a particular customer.

If the transaction is question is to be approved, a high signal appears in the conductor 190 qualifying the gate 192 to pass the identification signals from the conductor 196 through a communication system 198 to a central processor 200. The central processor 200 may take any of a wide variety of different forms as may the communication system 198. For example, the central processor 200 may comprise a general purpose computer, serving numerous remote stations in a department store, or a computer of sufficient capacity to accommodate a large geographical area which is interrogated through a communication system 198 comprising telephonic communication.

When identification signals from the card reader 194 are submitted to the central processor, various time-sharing structures may be utilized including program devices applied to the central processor 200. In any event, in due course, the central processor searches a file or other list or structure to determine whether or not the identified card has been revoked, cancelled, or otherwise incapable of supporting a credit purchase. As indicated, the central processor may comprise simply a large general-purpose computer operating in accordance with a search routine, the result of which is to provide an output in one of two output conductors 200 or 202 indicative of whether or not the transaction in question is approved. If the transaction approved, the signal in the conductor 200 is applied to a solenoid 204, which is mechanically coupled to activate the button 28 (FIG. 1). Alternatively, if the transaction in question is disapproved, a signal in the conductor 202 is passed to energize a solenoid 206 which actuates the disapproved button 30 (FIG. 1).

Figure 4:
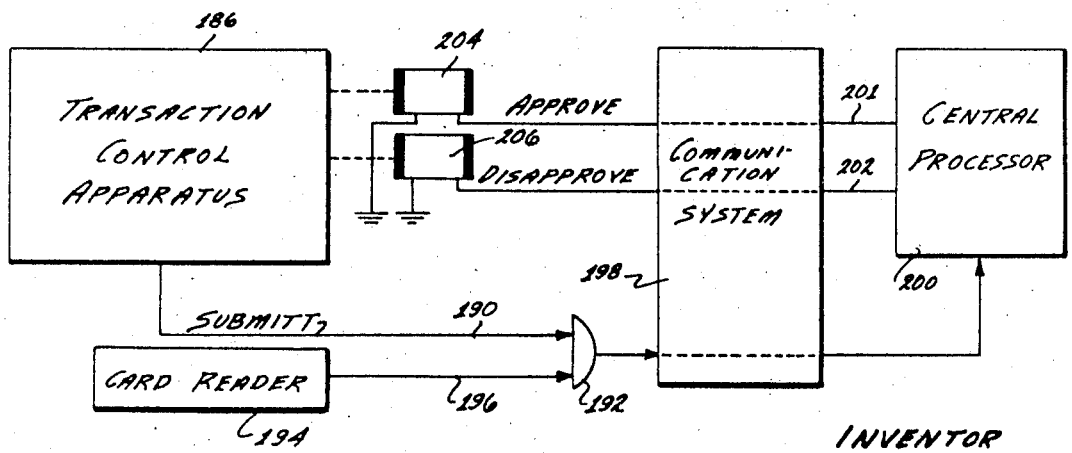
FIG. 4 is a schematic and block diagram of a somewhat more automated embodiment of the system hereof.

In the operation of the system of FIG. 4, the customer and the operator never truly know whether or not the transaction in question has been approved or disapproved until the operation is entirely complete. As a result, the central processor 200 can be variously operated in cooperation with a large number of remote stations whereby to disconnect certain stations from inquiry during peak hours of operation. In spite of such disconnection, personnel operating the system cannot perceive such an isolation with the result that they remain careful and judicious in handling the operation of the apparatus as well as processing transactions. As a result, the system hereof may be controlled on the basis of arbitrary standards initially established from an intelligent appraisal of a particular application. Subsequently, the system becomes self-controlling on the basis of experience at the station, the importance of transactions, and may further be controlled in accordance with the loading of a central processor. As a result, an effective, economical and reliable system is provided.

From a consideration of the above, it may be seen that the structure hereof may be variously employed, utilizing such structure to accomplish accurate and statistically effective transaction control. Furthermore, considerable experience and experimentation with the subject hereof has indicated that the unit may be employed to substantially reduce errors in the extension of credit. Of course, as indicated above, the system hereof may be readily adapted to provide a wide variety of different installations depending upon particular applications and may be incorporated in a wide variety of different systems; therefore, the apparatus as disclosed herein is to be deemed as merely an exemplary embodiment of the structure and the scope hereof shall not be restricted accordingly, but rather shall be interpreted in accordance with the claims as set forth below.

I claim:

1. A monetary transaction control apparatus for use in conjunction with a record of a transaction for indicating any requirement for approval of a transaction, comprising:
   an oscillation device for repetitively defining first and second distinctly separate time intervals;
   Selecting means coupled to said oscillation device, for establishing a selected relationship between the durations of said first and second time intervals;
   means for receiving said record to test said record for a requirement of approval, including means for indicating the requirement for an approval of the transaction represented thereby; and
   actuating means controlled by said oscillation device and coupled to said means for indicating, operable to actuate said means for indicating said approval upon the event of a test of said record in said means for receiving said record, during said first time interval said actuating means remaining quiescent upon the event of a test of said record during said second time interval.

2. A control apparatus according to claim 11, wherein said oscillation device has a frequency of oscillation greater than 50 cycles per minute.

3. A control apparatus according to claim 11 further including means to indicate an approval on said record, of a transaction indicated to require approval.

4. A control apparatus according to claim 11, wherein said selecting means includes means to vary said time relationship in accordance with the importance of said transaction.

5. A control apparatus according to claim 3, wherein said selecting means includes means to vary said time relationship in accordance with the operating history of said means to indicate approval of a transaction.

6. A control apparatus according to claim 3, wherein said oscillation device comprises a free-running multivibrator, wherein said means for varying the operation thereof comprises a variable impedence means, and wherein said means to indicate acceptance of a transaction varies said impedence means accordingly.

7. A control apparatus according to claim 6 further including means to vary said variable impedence means according to the importance of a transaction.

8. A control apparatus according to claim 7, for use in cooperation with an identification means, further including printing means to print from said identification means on said sales record means.

9. A control apparatus according to claim 8 wherein said printing means includes means for stamping an indication that approval is required, on said sales record.

10. A control apparatus according to claim 9 further including means to stamp an indication of approval on said sales record, which means alters said variable impedence means.